United States Patent [19]

Gu

[11] Patent Number: 4,682,900
[45] Date of Patent: Jul. 28, 1987

[54] THRUST BEARING UNDERSPRING

[75] Inventor: Alston L. Gu, Rancho Palos Verdes, Calif.

[73] Assignee: The Garrett Corporation, Los Angeles, Calif.

[21] Appl. No.: 811,972

[22] Filed: Dec. 19, 1985

[51] Int. Cl.⁴ ............................................. F16C 32/06
[52] U.S. Cl. .................................... 384/105; 384/106
[58] Field of Search ................. 384/99, 100, 103, 104, 384/105, 106, 119, 124, 125, 215, 223, 397

[56] References Cited

U.S. PATENT DOCUMENTS

| | | | |
|---|---|---|---|
| 3,382,014 | 5/1968 | Marley | 384/106 |
| 3,635,534 | 1/1972 | Barnett | 384/106 |
| 3,893,733 | 7/1975 | Silver et al. | 384/106 |
| 4,153,315 | 5/1979 | Silver et al. | 384/106 |
| 4,208,076 | 6/1980 | Gray et al. | 384/105 |
| 4,227,753 | 8/1980 | Wilcock | 384/105 |
| 4,247,155 | 1/1981 | Fortmann | 384/124 |
| 4,277,111 | 7/1981 | Gray et al. | 384/124 |
| 4,277,112 | 7/1981 | Heshmat | 384/124 |
| 4,462,700 | 7/1984 | Agrawal | 384/105 |

Primary Examiner—Stuart S. Levy
Assistant Examiner—David Werner
Attorney, Agent, or Firm—Albert J. Miller

[57] ABSTRACT

A foil thrust bearing having an underspring formed from a uniform thickness sheet wherein the underspring includes a plurality of arcuate tabs extending toward the thrust disk in the direction of rotation of the thrust runner.

42 Claims, 14 Drawing Figures

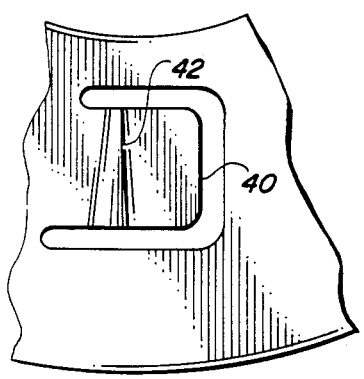
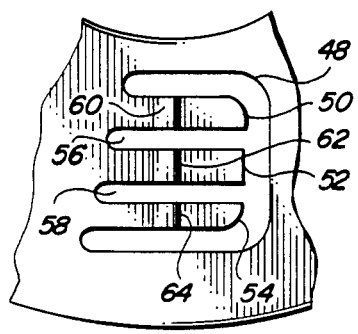
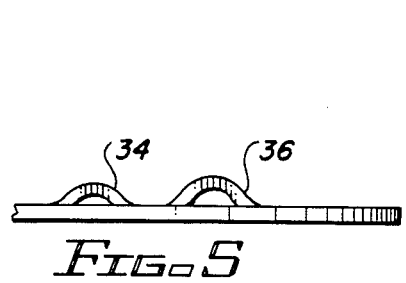
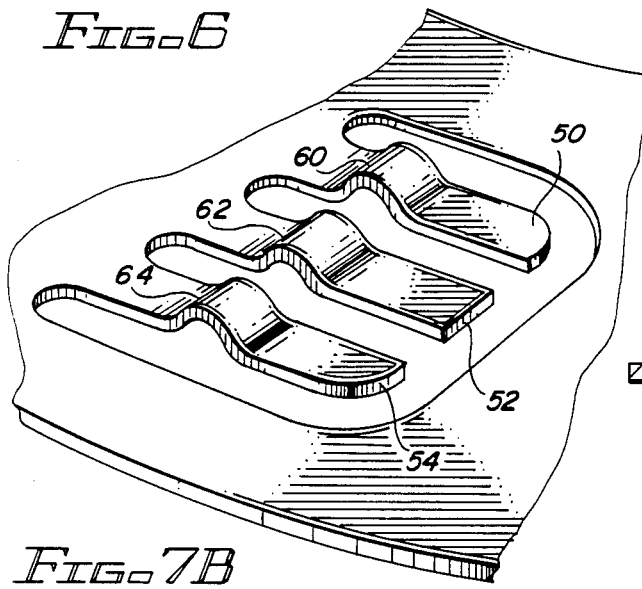
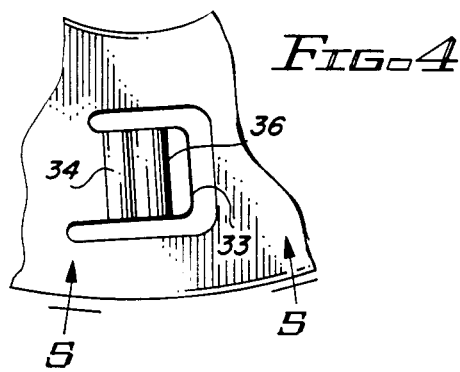
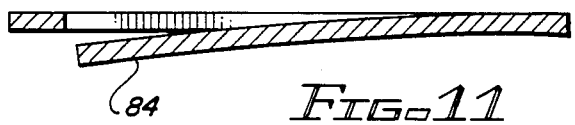
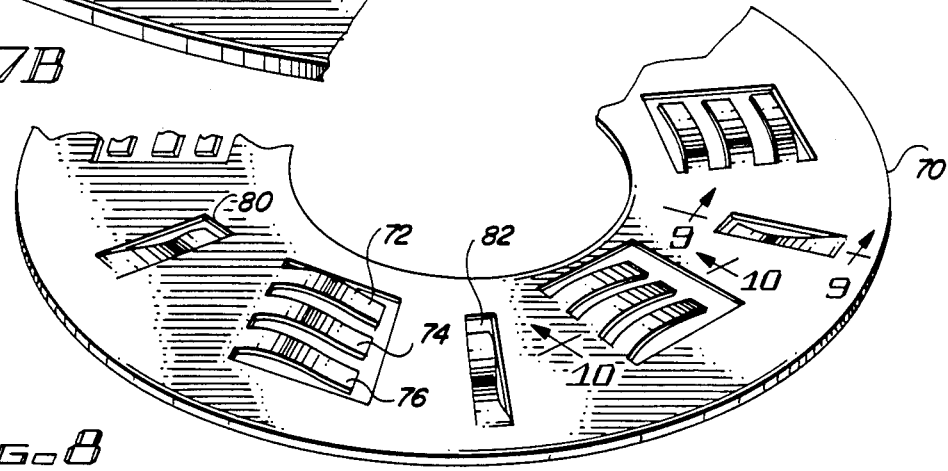
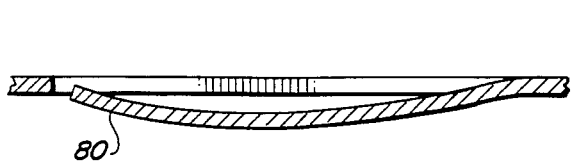
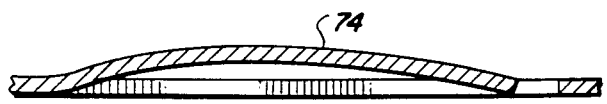

THRUST BEARING UNDERSPRING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534. Alternately a compliant unitary foil, such as illustrated in U.S. Pat. No. 4,247,155, has been proposed.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or undersprings beneath the foils to supply this required preload as exemplified in U.S. Pat. Nos. 3,893,733 and 4,153,315.

SUMMARY OF THE INVENTION

In the present invention, the foil thrust bearing is provided with a thrust bearing underspring stamped from a uniform thickness sheet. A plurality of spring bumps are formed in an underspring disk to provide improved load capacity and distribution.

BRIEF DESCRIPTION OF THE DRAWINGS

FIG. 4 is an enlarged partial top plan view of an alternate thrust bearing underspring of the present invention;

FIG. 5 is an edge view of the thrust bearing underspring of FIG. 4 taken along line 5—5 thereof;

FIG. 6 is an enlarged partial top plan view of another alternate thrust bearing underspring of the present invention;

FIG. 7A is an enlarged partial top plan view of yet another alternate thrust bearing underspring of the present invention;

FIG. 7B is an enlarged partial perspective view of the thrust bearing underspring of FIG. 7A;

FIG. 8 is an enlarged partial perspective view of a further alternate thrust bearing underspring of the present invention;

FIG. 9 is a sectional view of the thrust bearing underspring of FIG. 8 taken along line 9—9 thereof;

FIG. 10 is a sectional view of the thrust bearing underspring of FIG. 8 taken along line 10—10 thereof; and FIG. 11 is a sectional view of an alternate downwardly extending tab.

DESCRIPTION OF THE PREFERRED EMBODIMENTS

Figure 1:
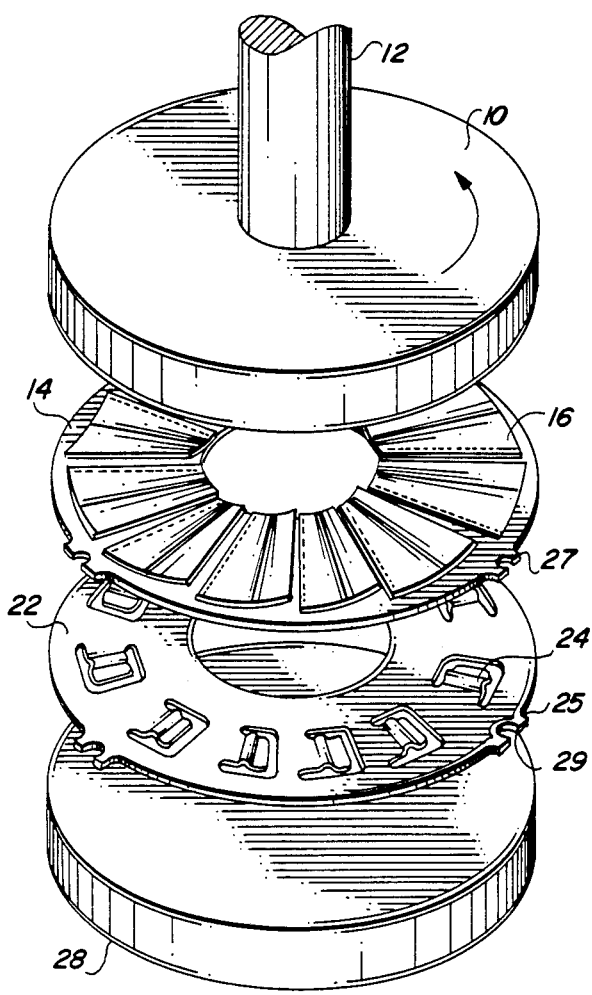
FIG. 1 is an exploded perspective view of a foil thrust bearing of the present invention.

As illustrated in FIG. 1, the thrust runner 10, including shaft 12, is rotatably supported on the thrust plate 28 by means of the thrust bearing disk 14 and thrust bearing stiffener or underspring 22. The thrust bearing disk 14 includes a plurality of compliant foils 16 while the thrust bearing underspring 22 includes a plurality of bumps 24 thereon to provide stiffness for the thrust bearing disk 14. Individual foils 16 may be mounted on the thrust bearing disk 14 as shown in FIG. 1, or alternately, the foils may be unitary or integral with the thrust bearing disk as is generally illustrated in U.S. Pat. No. 4,247,155. The underspring 22 may include outer projections 25 having cutouts 29 which can be utilized to maintain the position of the underspring 22 with respect to the thrust plate 28. Similar projections 27 may be spaced around the thrust bearing disk 14.

Figure 2A:
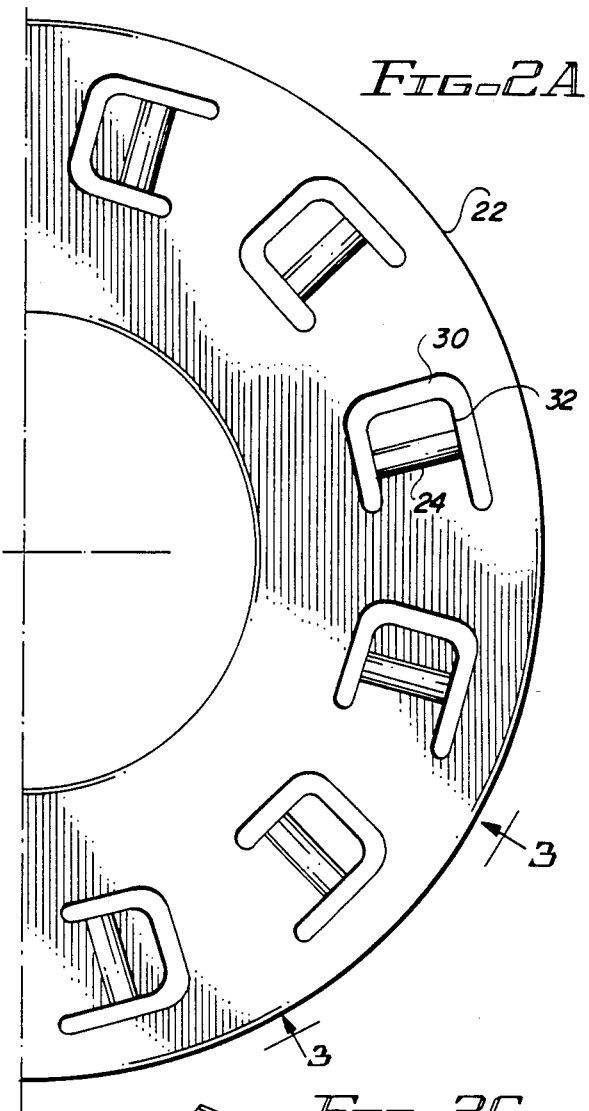
FIG. 2A is an enlarged partial top plan view of the thrust bearing underspring of the foil thrust bearing of FIG. 1.
Figure 2B:
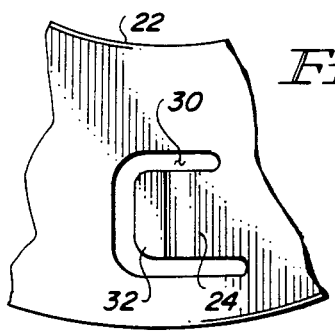
FIG. 2B is an enlarged partial bottom plan view of the thrust bearing underspring of FIG. 2A.
Figure 2C:
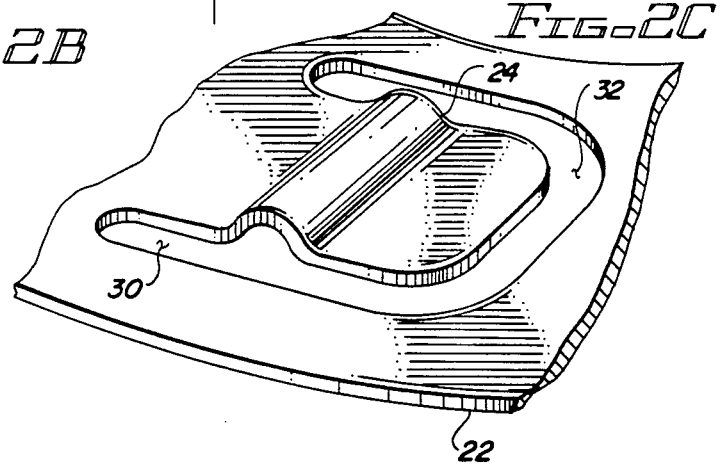
FIG. 2C is an enlarged perspective view of an individual bump of the thrust bearing underspring of FIG. 2A.
Figure 3:
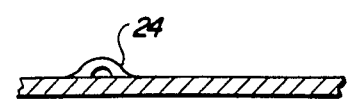
FIG. 3 is an edge view of the thrust bearing underspring of FIG. 2A taken along line 3—3 thereof.

As more fully shown in FIGS. 2A-3, the thrust bearing underspring 22 generally comprises a thin compliant ring disk having a thickness generally between 0.001 inches and 0.030 inches. A plurality of generally U-shaped slots 30, with the open ends thereof facing away from the direction of rotation of the thrust runner 10, extend through the entire thickness of the underspring 22. Each of these generally U-shaped slots 30 forms a tab 32 having its free end facing in the direction of rotation of the thrust runner 10. The bumps 24, which are generally radially extending, are formed by stamping on these tabs 32.

The number of U-shaped slots and hence the number of tabs is equal to the number of thrust bearing foils 16 on the thrust bearing disk 14 with an individual tab disposed generally beneath an individual foil. The height of the bumps 24 is generally between 0.003 inches to 0.060 inches. The radial length of the bump would depend upon the size of the bearing and would generally be between 0.2 inches to 8 inches.

As illustrated in FIGS. 4 and 5, the tab 33 may include more than a single bump, such as the two bumps 34 and 36. Likewise, the bump 36 closest to the free end of tab 33 may have a height greater than the height of the bump 34 closer to the base of the tab 33. The height of the bump 36 would generally be between 0.0005 inches and 0.030 inches greater than the height of the bump 34.

FIG. 6 illustrates a tab 40 having a bump 42 in which the width of the bump increases radially. It should be recognized for purposes of illustration the radial divergence of the bump 42 is shown as exaggerated. The sides of the bump 42 would generally be radial lines.

As illustrated in FIGS. 7A and 7B, the tab produced by U-shaped slot 48 may be divided into more than one prong, for example, inner prong 50, middle prong 52 and outer prong 54 by means of an inner slot 56 and outer slot 58. This arrangement produces an inner bump 60, middle bump 62, and outer bump 64, each of which are generally radially aligned.

An alternate underspring 70 is illustrated in FIGS. 8-11. Underspring 70 includes a plurality of upwardly extending tabs, each having a inner prong 72, middle prong 74, and outer prong 76. Each of the prongs has a generally arcuate or curved shape. Also included in underspring 70 are a plurality of downwardly extending tabs 80 formed in radially extending slots 82. The tabs 80 may also be arcuate or curved in shape as shown in FIG. 9 or the tabs 84 may be straight as shown in FIG. 11.

While existing chemically etched undersprings are difficult to produce in a highly repeatable manner due to the difficulty in controlling the critical thickness dimensions, undersprings stamped in accordance with the present invention utilizing a constant thickness sheet material consistently produce the series of shallow bumps in a highly repeatable manner. This not only results in a much less complex manufacturing process but provides greater control and better load capacity for the underspring. By slotting the tabs, even more load distribution can be produced in the radial direction. Under load conditions the bumps deform to yield a greater support area for the thrust bearing foil and thus generate higher load capacity.

Good bearing damping is also achieved when the bump flares under load and the free end of the tab stretches and rubs against the bearing structure. The bump is generally quite stiff in order to provide good load capacity. The downwardly extending tabs are much less stiff or weaker than the upwardly extending tabs and are utilized to provide proper preload in the bearing assembly. The upwardly extending tabs, which provide primary stiffness for the bearing, generally have a stiffness at least $10^2$ times greater than the stiffness of the downwardly extending tabs and this stiffness may be as great as $10^5$ times greater. In other words, in operation the downwardly extending tabs will yield or deform under load before any yielding or deformation of the upwardly extending tabs.

While specific embodiments of the invention have been illustrated and described, it is understood that these are provided by way of example only. While the invention is shown as a thrust bearing, it should be readily apparent that it is equally applicable to a conical bearing which has a thrust component. The invention is to be construed as being limited only by the proper scope of the following claims.

I claim:

1. A fluid thrust bearing comprising:
   a thrust runner;
   a thrust plate to rotatably support the thrust runner; and
   a compliant foil bearing operably disposed between said thrust runner and said thrust plate and mounted on said thrust plate, said compliant foil bearing including a thrust disk having a plurality of converging surface individual compliant foils disposed towards said thrust runner and a foil stiffener disk disposed between the thrust disk and the thrust plate, the foil stiffener disk including a plurality of integral tabs formed from said foil stiffener disk and extending towards said thrust disk in the direction of rotation of said thrust runner with an individual tab generally disposed in a supporting relationship towards an individual foil on said thrust disk and said tabs divided into at least two prongs having a generally arcuate curvature.

2. The fluid thrust bearing of claim 1 wherein each of said plurality of tabs having a base at the foil stiffener disk and a free end extending therefrom and includes a first radially extending bump thereacross disposed near the free end of said tab and a second radially extending bump thereacross disposed near the base of said tab.

3. The fluid thrust bearing of claim 2 wherein the first bump has a height generally between 0.0005 inches and 0.030 inches greater than the height of the second bump.

4. The fluid thrust bearing of claim 1 wherein each of said plurality of tabs includes a single radially extending bump thereacross.

5. The fluid thrust bearing of claim 4 wherein the radially extending bumps have a height generally between 0.003 inches to 0.060 inches.

6. The fluid thrust bearing of claim 4 wherein the bumps radially outwardly diverge.

7. The fluid thrust bearing of claim 6 wherein the bumps have sides which are radial lines.

8. The fluid thrust bearing of claim 4 wherein said converging surface compliant foils are individually mounted upon said thrust disk.

9. The fluid thrust bearing of claim 4 wherein said converging surface compliant foils are integral with said thrust disk.

10. The fluid thrust bearing of claim 1 wherein each of said plurality of tabs is divided into three prongs.

11. A fluid thrust bearing comprising:
    a thrust runner;
    a thrust plate to rotatably support the thrust runner; and
    a compliant foil bearing operably disposed between said thrust runner and said thrust plate and mounted on said thrust plate, said compliant foil bearing including a thrust disk having a plurality of converging surface compliant foils disposed towards said thrust runner and a foil stiffener disk disposed between the thrust disk and the thrust plate, the foil stiffener disk including a plurality of first tabs extending in the direction of rotation of said thrust runner toward said thrust disk with an individual tab generally disposed in a supporting relationship towards an individual foil on said thrust disk and said first tabs divided into at least two generally arcuate prongs, said foil stiffener disk also including a plurality of second tabs extending in a generally radial direction towards said thrust plate.

12. The fluid thrust bearing of claim 11 wherein stiffness of the first tabs is greater than the stiffness of the second tabs.

13. The fluid thrust bearing of claim 12 wherein the stiffness of the first tabs is at least $10^2$ times greater than the stiffness of the second tabs.

14. The fluid thrust bearing of claim 13 wherein the stiffness of the first tabs is between $10^2$ and $10^5$ times greater than the stiffness of the second tabs.

15. The fluid thrust bearing of claim 11 wherein the second tabs are arcuate.

16. The fluid thrust bearing of claim 11 wherein the second tabs are generally straight.

17. The fluid thrust bearing of claim 11 wherein the height of the upwardly extending generally arcuate tabs is between 0.003 and 0.060 inches.

18. The fluid thrust bearing of claim 11 wherein said converging surface compliant foils are individually mounted upon said thrust disk.

19. The fluid thrust bearing of claim 11 wherein said converging surface compliant foils are integral with said thrust disk.

20. The fluid thrust bearing of claim 11 wherein each of said plurality of tabs includes two radially extending bumps thereacross.

21. The fluid thrust bearing of claim 20 wherein each of said plurality of first tabs having a base and a free end and includes a first radially extending bump thereacross disposed near the free end of said tab and a second radially extending bump thereacross disposed near the base of said tab.

22. The fluid thrust bearing of claim 21 wherein the first bump has a height generally between 0.0005 inches and 0.030 inches greater than the height of the second bump.

23. The fluid thrust bearing of claim 11 wherein each of said plurality of first tabs includes at least one radially extending bump thereacross.

24. The fluid thrust bearing of claim 23 wherein the radially extending bumps have a height generally between 0.003 inches to 0.060 inches.

25. The fluid thrust bearing of claim 24 wherein the radially extending bumps have a radial length generally between 0.2 inches and 8.0 inches.

26. The fluid thrust bearing of claim 23 wherein the bumps radially outwardly diverge.

27. The fluid thrust bearing of claim 26 wherein the bumps have sides which are radial lines.

28. The fluid thrust bearing of claim 11 wherein each of said plurality of tabs is divided into three prongs.

29. An underspring for a foil thrust bearing comprising:
 a compliant ring disk; and
 a plurality of tabs integral with and formed from said ring disk with each tab divided into at least two prongs having a generally arcuate curvature with respect to said ring disk and having at least one radially extending bump thereacross.

30. The underspring of claim 29 wherein each of said plurality of tabs includes two radially extending bumps thereacross.

31. The underspring of claim 30 wherein each of said plurality of tabs having a base at the foil stiffener disk and a free end extending therefrom and includes a first radially extending bump thereacross disposed near the free end of said tab and a second radially extending bump thereacross disposed near the base of said tab.

32. The underspring of claim 31 wherein the first bump has a height generally between 0.0005 inches and 0.030 inches greater than the height of the second bump.

33. The underspring of claim 29 wherein the radially extending bumps have a height generally between 0.003 inches to 0.060 inches.

34. The underspring of claim 29 wherein the bumps radially outwardly diverge.

35. The underspring of claim 34 wherein the bumps have sides which are radial lines.

36. The underspring of claim 20, wherein each of said plurality of tabs is divided into three prongs.

37. An underspring for a foil thrust bearing comprising:
 a compliant ring disk having first and second opposed flat surfaces:
 a plurality of first tabs integral with and formed from said ring disk extending from the first flat surface thereof, said first tabs divided into at least two prongs having a generally arcuate curvature and including at least one radially extending bump thereacross; and
 a plurality of second tabs integral with and formed from said ring disk and generally extending in a radial direction from the second flat surface thereof.

38. The underspring of claim 37 wherein the stiffness of the first tabs is greater than the stiffness of the second tabs.

39. The underspring of claim 38 wherein the stiffness of the first tabs is at least $10^2$ times greater than the stiffness of the second tabs.

40. The underspring of claim 39 wherein the stiffness of the first tabs is between $10^2$ and $10^5$ times greater than the stiffness of the second tabs.

41. The underspring of claim 37 wherein the second tabs are generally straight.

42. The underspring of claim 37 wherein the height of the first tabs is between 0.003 and 0.060 inches from the surface of the compliant ring disk.

* * * * *

UNITED STATES PATENT AND TRADEMARK OFFICE
CERTIFICATE OF CORRECTION

PATENT NO. : 4,682,900
DATED : July 28, 1987
INVENTOR(S) : Alston Lee-Van Gu

It is certified that error appears in the above-identified patent and that said Letters Patent is hereby corrected as shown below:

Column 5, line 9, after "wherein" insert --the--

Column 6, line 28, change "20" to --29--

Signed and Sealed this

Eighth Day of March, 1988

Attest:

DONALD J. QUIGG

*Attesting Officer*      *Commissioner of Patents and Trademarks*